UNITED STATES PATENT OFFICE.

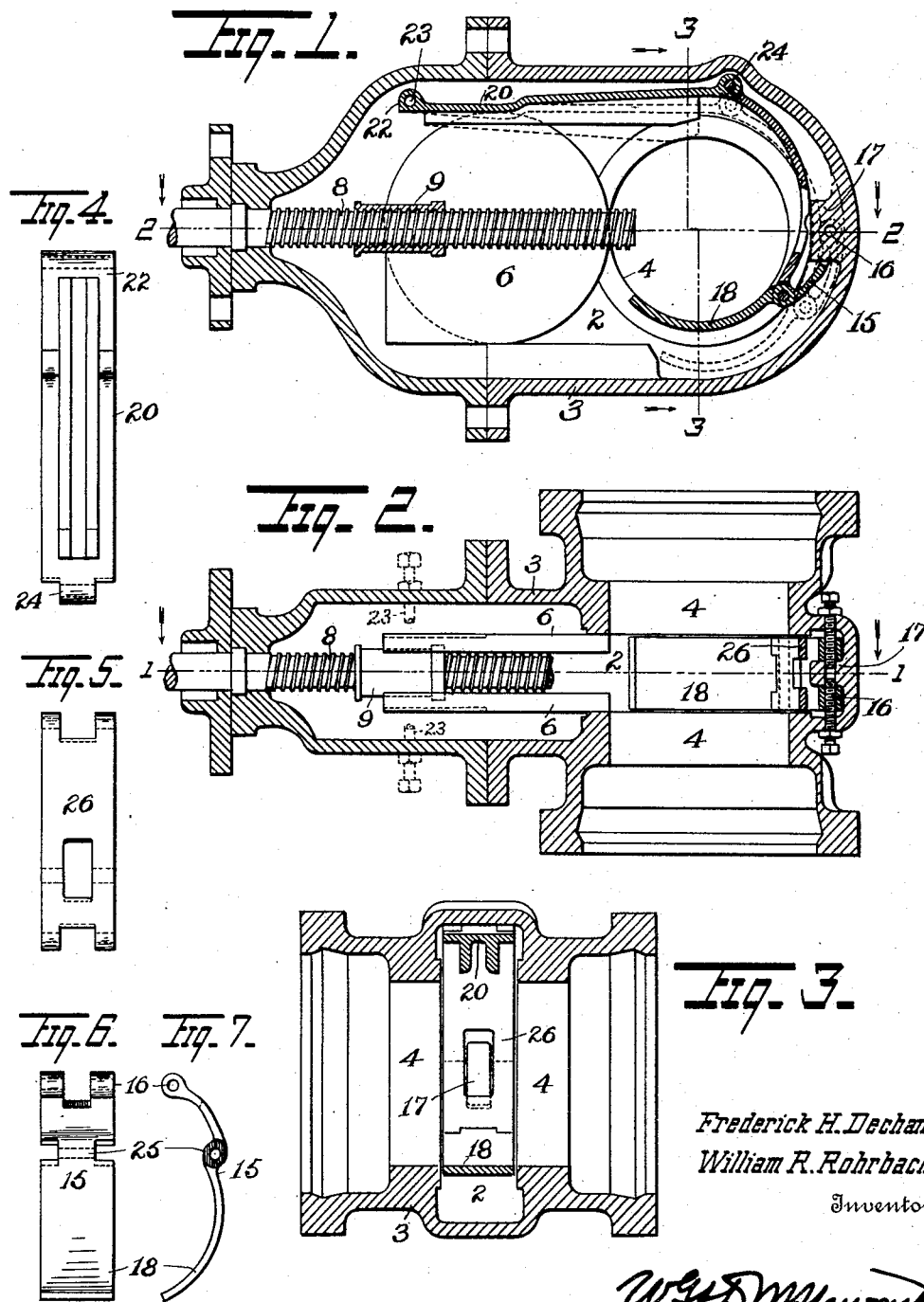

FREDERICK H. DECHANT, OF READING, AND WILLIAM R. ROHRBACH, OF SUNBURY, PENNSYLVANIA.

HORIZONTAL GATE-VALVE.

1,171,842.  Specification of Letters Patent.  Patented Feb. 15, 1916.

Application filed October 15, 1915. Serial No. 55,932.

*To all whom it may concern:*

Be it known that we, FREDERICK H. DECHANT and WILLIAM R. ROHRBACH, both citizens of the United States, residing at Reading and Sunbury, respectively, in the counties of Berks and Northumberland and State of Pennsylvania, have invented certain new and useful Improvements in Horizontal Gate-Valves, of which the following is a specification.

Our invention relates to stop valves employing a reciprocating valve in connection with a movable shutter or false-bottom for the liquid passage-way, such as is shown in our pending application Serial No. 874,381, filed November 28, 1914; and it consists in an improved shutter mechanism adapted particularly for cases in which a horizontal instead of the usual vertical arrangement is required.

The invention is fully described in connection with the accompanying drawings, and the novel features are specifically pointed out in the claims.

Figure 1 shows a longitudinal section, on the line 1—1 of Fig. 2, of a horizontal gate valve embodying the invention. Fig. 2 is a longitudinal section on the line 2—2 of Fig. 1. Fig. 3 is a cross-section in the line 3—3 of Fig. 1. Figs. 4, 5, 6 and 7 are detail views of the shutter devices.

The general construction indicated corresponds with that shown in our prior application referred to; the essential difference being that instead of its being adapted for operation when arranged in substantially vertical position, as usual, it is adapted for operation when arranged horizontally, as is called for under some conditions of service; the present shutter mechanism being especially applicable in the latter case, but serving in like manner to insure proper seating of the valve.

The valve chamber 2 of the casing 3 communicates with the intersecting passage-way 4, 4, as controlled by the duplicate-disk gate valve 6, 6; a reciprocating movement being imparted to the latter, as usual, by the operating screw 8 and engaging nut 9. As shown this reciprocating movement is in a horizontal direction, the vertical plane 3—3 (Fig. 1) of the flow passage-way 4, 4, being approximately at right angles thereto; so that the bottom of the chamber in the line of flow, is below the valve-operating axis 2—2 of Fig. 1, instead of being at the end of the chamber as in our pending application. Thus a different shutter mechanism is called for, and is provided as follows: The false-bottom shutter 15 is pivoted at one end, 16, to a pivot-lug 17 at the far end of the valve casing 2, preferably in the center line 2—2 of the valve movement: so that its curved depending portion 18 may either be elevated to form a bottom flush with that of the intersecting flow-passage 4, 4, as indicated in full lines Fig. 1; or lowered, as indicated in dotted lines, so as to permit the proper closing and seating of the valve disks 6, 6. The movement of the shutter to these two positions is effected automatically by the opening and closing movements of the valve respectively. To effect this, a shutter-operating lever 20 is arranged horizontally in the chamber 2, above the path of the valve 6, 6, with a pivotal connection of one end thereof, 22, to the casing at 23, and a pivotal connection of its opposite end, 24, to the shutter at 25; the latter connection being effected through a curved link 26 in the end portion of the chamber 2 as indicated. The lever 20, together with the attached shutter 15 and its connecting link 26, tends to fall by gravity so as to position the shutter as indicated in dotted lines Fig. 1: but said lever is arranged to bear upon the upper edges of the valve disks 6, 6 so that the latter during its guided opening movement will lift it to position the shutter as indicated in full lines, while the reverse or closing movement of the valve permits it to fall as stated. To insure that this falling movement of the shutter occurs as required for the proper closing and seating of the valve, we arrange that the latter contact with the free end of the raised shutter so as to positively lower it as the valve is moved to closed position.

The false bottom shutter, as will be readily understoood, permits free flow of the passing liquid through the valve chamber when the valve is opened, so as to carry with it any heavy foreign matter which might otherwise be caught in the chamber so as to obstruct the closing of the valve; while at the same time both it and the opening mechanism therefor are automatically displaced by the movement of the valve to proper closing position.

What we claim is:

1. A horizontal gate valve having a casing with a valve chamber and a communicating flow passage-way, a reciprocating valve in said chamber, a false-bottom shutter pivotally mounted at the end of said chamber, and a valve-operated horizontal lever pivotally connected to said shutter.

2. A horizontal gate valve having a casing with a valve chamber and a communicating flow passage-way, a reciprocating valve in said chamber, a false-bottom shutter pivotally mounted at the end of said chamber, and a horizontal shutter-opening lever arranged to be positively actuated by the opening movement of the valve.

3. A horizontal gate valve having a casing with a valve chamber and a communicating flow passage-way, a reciprocating valve in said chamber, a false-bottom shutter pivotally mounted at the end of said chamber, and a horizontal shutter-opening lever; said lever being positively actuated by movement of the valve in one direction so as to position the shutter for positive operation by the reverse movement of the valve.

4. A horizontal gate valve having a casing with a valve chamber and a communicating flow passage-way, a reciprocating valve in said chamber, a false-bottom shutter pivotally mounted at the one end of said chamber, and a pivoted horizontal lever supported upon the reciprocating valve, and a link pivotally connected to said lever and the shutter.

In testimony whereof we affix our signatures.

FREDERICK H. DECHANT.
WILLIAM R. ROHRBACH.

Witnesses:
F. A. WITMER,
HARRY LANDON.

Copies of this patent may be obtained for five cents each, by addressing the "Commissioner of Patents, Washington, D. C."